United States Patent
Zhou

(10) Patent No.: US 11,500,809 B2
(45) Date of Patent: Nov. 15, 2022

(54) SINGLE-WIRE TWO-WAY COMMUNICATION CIRCUIT AND SINGLE-WIRE TWO-WAY COMMUNICATION METHOD

(71) Applicant: Fulian Precision Electronics (Tianjin) Co., LTD., Tianjin (CN)

(72) Inventor: Xiao-Long Zhou, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 17/233,815

(22) Filed: Apr. 19, 2021

(65) Prior Publication Data

US 2022/0075753 A1  Mar. 10, 2022

(30) Foreign Application Priority Data

Sep. 10, 2020 (CN) .......................... 202010948876.4

(51) Int. Cl.
*G06F 13/42* (2006.01)
*G06F 15/78* (2006.01)
*G06F 13/16* (2006.01)
*G06F 13/24* (2006.01)

(52) U.S. Cl.
CPC ...... *G06F 13/4291* (2013.01); *G06F 13/1668* (2013.01); *G06F 13/24* (2013.01)

(58) Field of Classification Search
None
See application file for complete search history.

(56) References Cited

U.S. PATENT DOCUMENTS

| | | | |
|---|---|---|---|
| 9,367,517 B2 | 6/2016 | Jones et al. | |
| 2005/0165989 A1* | 7/2005 | Kim | G06F 13/4291 710/260 |
| 2006/0238526 A1* | 10/2006 | Kim | G09G 5/006 345/204 |
| 2014/0122833 A1* | 5/2014 | Davis | G06F 1/266 712/E9.002 |
| 2016/0170930 A1* | 6/2016 | Weng | G06F 1/26 710/110 |
| 2018/0269864 A1* | 9/2018 | Akahane | G11C 16/26 |
| 2022/0075753 A1* | 3/2022 | Zhou | G06F 13/1668 |

FOREIGN PATENT DOCUMENTS

CN  102143056 A  8/2011

\* cited by examiner

*Primary Examiner* — Hyun Nam
(74) *Attorney, Agent, or Firm* — ScienBiziP, P.C.

(57) ABSTRACT

A single-wire two-way communication circuit includes two chips and a data transmission line coupled between the two chips. Each chip includes a random access memory, a data control module, a data line control module, and a data line monitoring module. The random access memory stores data. The data control module obtains data of a first address from the random access memory and stores data of a second address received from the other chip into a second address of the random access memory. The data line control module sends the obtained data of the first address to the other chip through the data transmission line to perform a write operation. The data line monitoring module receives the data of the second address sent by the other chip through the data transmission line to perform a read operation.

14 Claims, 7 Drawing Sheets

SINGLE-WIRE TWO-WAY COMMUNICATION CIRCUIT AND SINGLE-WIRE TWO-WAY COMMUNICATION METHOD

FIELD

The subject matter herein generally relates to communication circuits, and more particularly to a single-wire two-way communication circuit and a single-wire two-way communication method.

BACKGROUND

Generally, communication between chips on a circuit board is through a low-speed bus. The low-speed bus can be an I2C bus, an LPC bus, or a serial general purpose input/output bus. Current communication requires multiple input/output pins of each chip. Thus, a lack of input/output pins may occur.

BRIEF DESCRIPTION OF THE DRAWINGS

Implementations of the present disclosure will now be described, by way of embodiments, with reference to the attached figures.

DETAILED DESCRIPTION

Figure 1:
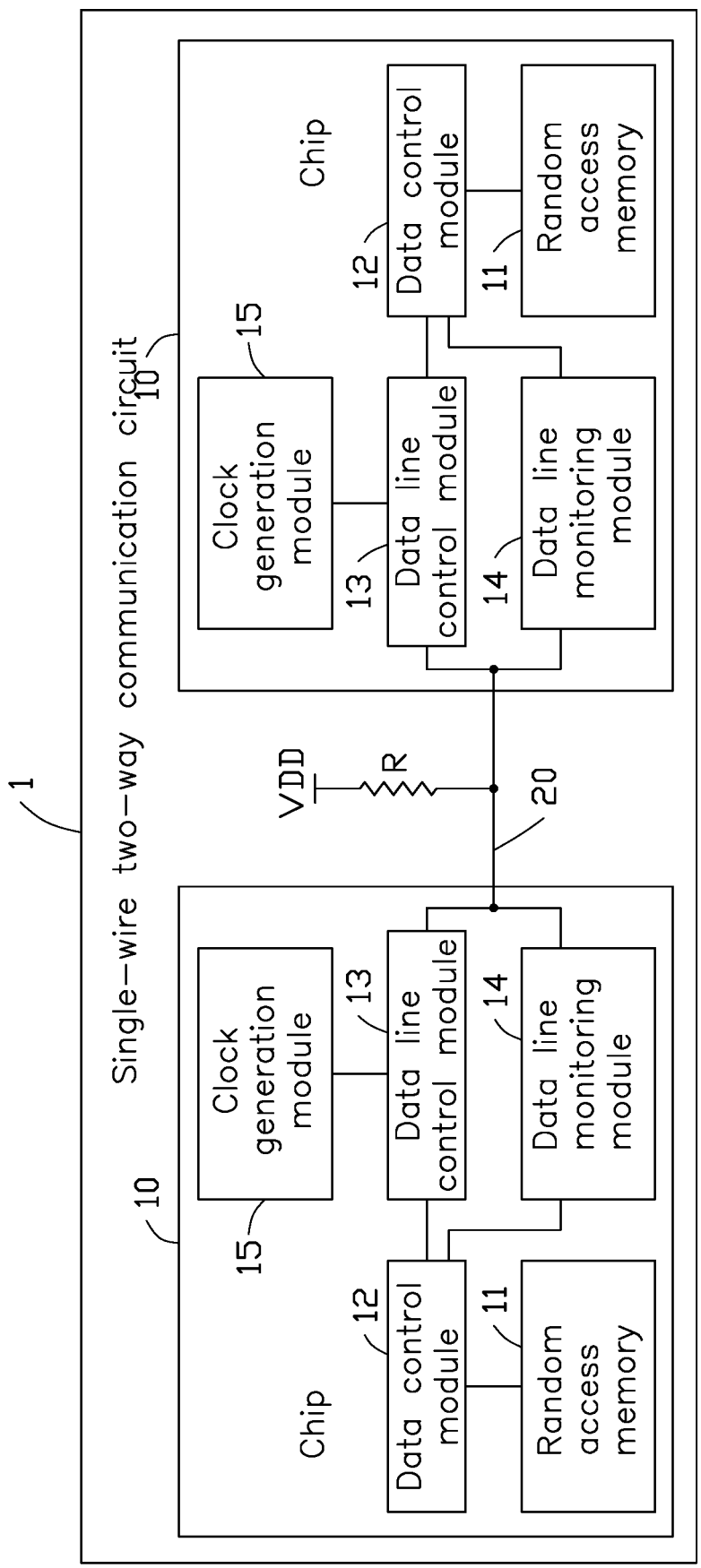
FIG. 1 is a block diagram of an embodiment of a single-wire two-way communication circuit.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 is a block diagram of an embodiment of a single-wire two-way communication circuit 1. The single-wire two-way communication circuit 1 includes two chips 10 and one data transmission line 20. In FIG. 1, the two chips 10 are represented as a first chip and a second chip. The data transmission line 20 is coupled between the two chips 10. Each chip 10 includes a random access memory 11, a data control module 12, a data line control module 13, and a data line monitoring module 14. The random access memory 11 is used to store data. The data control module 12 is coupled to the random access memory 11. The data control module 12 is used to obtain data in a first address of the random access memory 11 and store data received from a second address of the random access memory 11 of the other chip 10 into a second address of the random access memory 11. The data line control module 13 is coupled to the data control module 12 and the data transmission line 20. The data line control module 13 is configured to send the obtained data of the first address to the other chip 10 through the data transmission line 20 for writing. The data line monitoring module 14 is coupled to the data control module 12 and the data transmission line 20. The data line monitoring module 14 is configured to receive the data of the second address sent by the other chip 10 through the data transmission line 20 to perform a read operation. The first address and the second address may be the same or different.

In one embodiment, the single-wire two-way communication circuit 1 further includes a boost resistor R and a boost power VDD. One end of the boost resistor R is coupled to the data transmission line 20, and another end of the boost resistor R is coupled to the boost power VDD.

In one embodiment, the data line control module 13 is further configured to send a low-level write instruction and the first address to the other chip 10 through the data transmission line 20 to perform the write instruction on the other chip 10. The data line control module 13 is further configured to send a low-level read instruction and the second address to the other chip 10 through the data transmission line 20 to perform the read operation on the other chip 10. The data line monitoring module 14 is further configured to receive the write instruction and the first address sent by the other chip 10 through the data transmission line 20, and receive the read instruction and the second address sent by the other chip 10 through the data transmission line 20.

In one embodiment, the data line control module 13 is further coupled to the data line monitoring module 14. The data line control module 13 is further configured to wait a first preset clock cycle after sending the low-level write instruction and the first address to the other chip 10 through the data transmission line 20. The data line control module 13 is further configured to wait a second preset clock cycle after the data line monitoring module 14 receives the read instruction and the second address sent by the other chip 10 through the data transmission line 20. The first preset clock cycle and the second preset clock cycle can be set as required, such as three clock cycles. The first preset clock cycle and the second preset clock cycle may be the same or different. While the data line control module 13 is waiting, the data control module 12 obtains data from the random access memory 11.

In one embodiment, the data line monitoring module 14 is further configured to wait the first preset clock cycle after receiving the write instruction and the first address sent by the other chip 10 through the data transmission line 20. The data line monitoring module 14 is further configured to wait the second preset clock cycle after the data line control module 13 sends the low-level read instruction and the second address to the other chip 10 through the data transmission line 20. While the data line monitoring module 14 is waiting, the other chip 10 sends data.

In one embodiment, the data line monitoring module 14 is further configured to determine whether a response including address information is received from the other chip 10 after the data line control module 13 sends the low-level write instruction and the first address to the other chip 10 through the data transmission line 20. In response that a response including address information is received from the other chip 10, the data line control module 13 waits the first preset clock cycle. In response that a response including address information is not received from the other chip 10, the data line control module 13 generates a communication termination flag bit and enters an idle state. The data line control module 13 is further configured to send a response including address information to the other chip 10 after the data line monitoring module 14 receives the write instruction and the first address sent by the other chip 10 through the data transmission line 20 and before the data line monitoring module 14 waits the first preset clock cycle.

In one embodiment, the data line monitoring module 14 is further configured to determine whether a response including address information is received from the other chip 10 after the data line control module 13 sends the low-level read instruction and the second address to the other chip 10 through the data transmission line 20. In response that a response including address information is received from the other chip 10, the data line monitoring module 14 waits the second preset clock cycle. In response that a response including address information is not received from the other chip 10, the data line monitoring module 14 generates the communication termination flag bit and enters the idle state. The data line control module 13 is further configured to send a response including address information to the other chip 10 after the data line monitoring module 14 receives the read instruction and the second address sent by the other chip 10 through the data transmission line 20 and before the data line control module 13 waits the second preset clock cycle.

In one embodiment, each chip 10 further includes a clock generation module 15. The clock generation module 15 is used to generate a clock frequency synchronization signal when the chip 10 is powered on. The data line control module 13 is further configured to send the clock frequency synchronization signal to the other chip 10 through the data transmission line 20, and then enter the idle state. The data line monitoring module 14 is further configured to receive the clock frequency synchronization signal sent by the other chip 10 through the data transmission line 20, perform clock frequency synchronization processing with the other chip 10 according to the clock frequency synchronization signal, and then enter the idle state.

In one embodiment, the data line monitoring module 14 is further configured to monitor a level of the data transmission line 20 in the idle state. When the level of the data transmission line 20 changes from a high level to a low level, the data line monitoring module 14 performs clock phase synchronization processing with the other chip 10 at a falling edge of the level.

In one embodiment, the data line control module 13 is further configured to generate the communication termination flag bit after sending the data of the first address through the data transmission line 20, and then enter the idle state. The data line monitoring module 14 is further configured to generate the communication termination flag bit after the data control module 12 stores the data of the second address received from the other chip 10 into the second address of the random access memory 11, and then enter the idle state.

Figure 2:
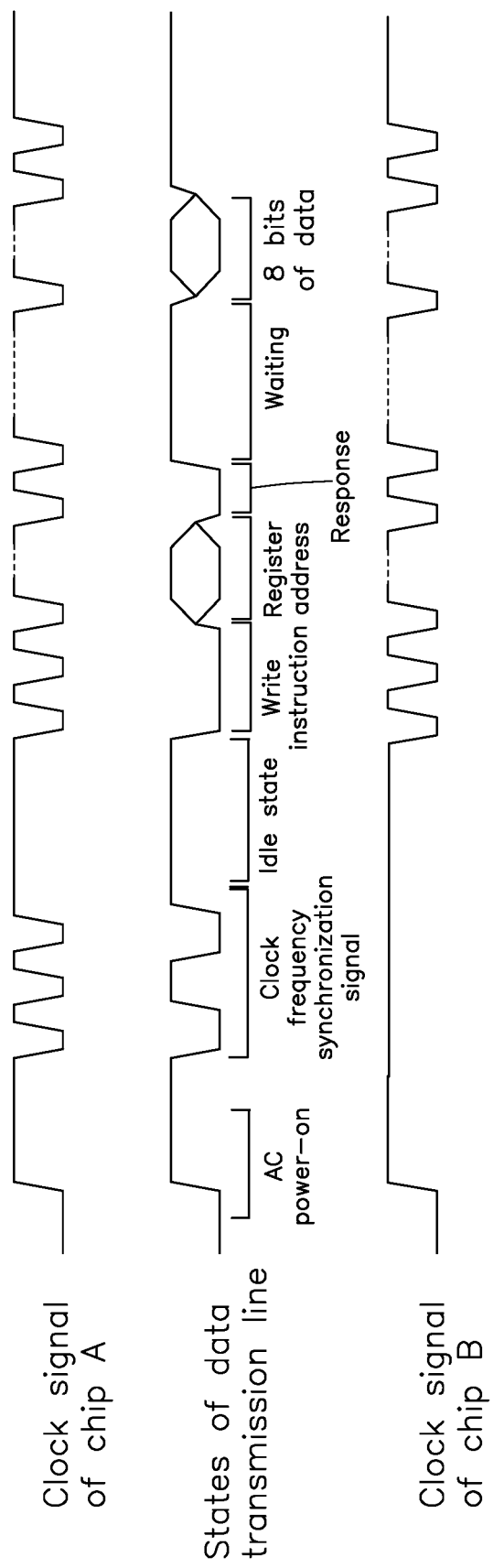
FIG. 2 is a timing diagram when a write operation is performed between two chips in the single-wire two-way communication circuit.

FIG. 2 is a timing diagram when a write operation is performed between the two chips 10 in the single-wire two-way communication circuit 1. The two chips 10 are a chip A and a chip B. The write operation between the two chips in FIG. 2 refers to the chip A performing the write operation to the chip B. The operations performed by the chip A in sequence are: powering on the AC, sending a low-high-low clock frequency synchronization signal, entering an idle state, sending a low-low write instruction and a register address, waiting for chip B to respond, waiting the first preset clock cycle, and sending eight bits of data. The states of the data transmission line 20 in sequence are: high AC power-on, low-high-low clock frequency synchronization signal, high idle state, low-low write instruction and register address data, low response signal, a waiting with a high first preset clock cycle, and eight bits of data. The operations performed by the chip B in sequence are: receiving the clock frequency synchronization signal and performing clock frequency synchronization processing, entering the idle state, monitoring the level of the data transmission line 20, performing clock phase synchronization processing with the other chip 10 at the falling edge when the level of the data transmission line changes from high to low, receiving the write instruction and the register address, responding to chip A, waiting the first preset clock cycle, and receiving eight bits of data. The write instruction is two clock cycles. The register address is eight clock cycles. The response is one clock cycle. Waiting is the first preset clock cycle. The eight bits of data are eight clock cycles.

Figure 3:
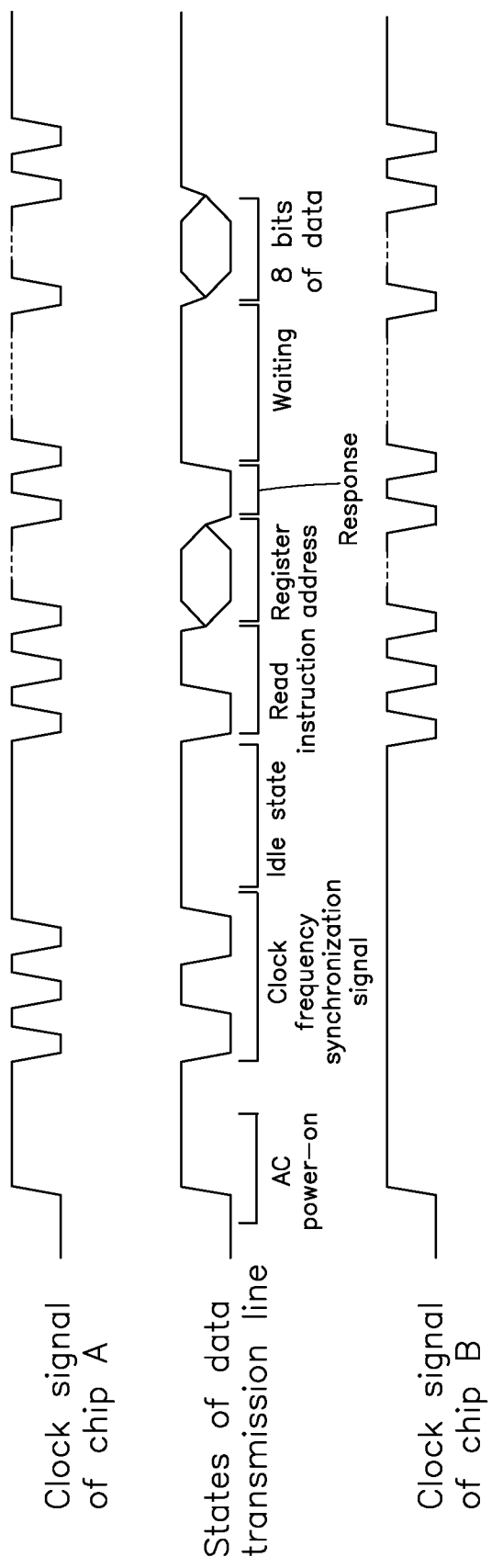
FIG. 3 is a timing diagram when a read operation is performed between two chips in the single-wire two-way communication circuit.

FIG. 3 is a timing diagram when a read operation is performed between the two chips 10 in the single-wire two-way communication circuit 1. The two chips 10 are the chip A and the chip B. The read operation between the two chips 10 in FIG. 3 refers to the chip A performing a read operation to the chip B. The operations performed by the chip A in sequence are: powering on the AC, sending a low-high-low clock frequency synchronization signal, entering the idle state, sending a low-high read instruction and a register address, waiting for chip B to respond, waiting the second preset clock cycle, and sending eight bits of data. The states of the data transmission line 20 in sequence are: high AC power-on, low-high-low clock frequency synchronization signal, high idle state, low-high read instruction and register address data, low response signal, a waiting with a high second preset clock cycle, and eight bits of data. The operations performed by the chip B in sequence are: receiving the clock frequency synchronization signal and performing clock frequency synchronization processing, entering the idle state, monitoring the level of the data transmission line 20, performing clock phase synchronization processing with the other chip 10 at the falling edge of the level when the level of the data transmission line 20 changes from high to low, receiving the read instruction and register address, responding to the chip A, waiting the second preset clock cycle, and receiving eight bits of data. The read instruction is two clock cycles. The register address is eight clock cycles. The response is one clock cycle. Waiting is the second preset clock cycle. The eight bits of data are eight clock cycles.

Figure 4:
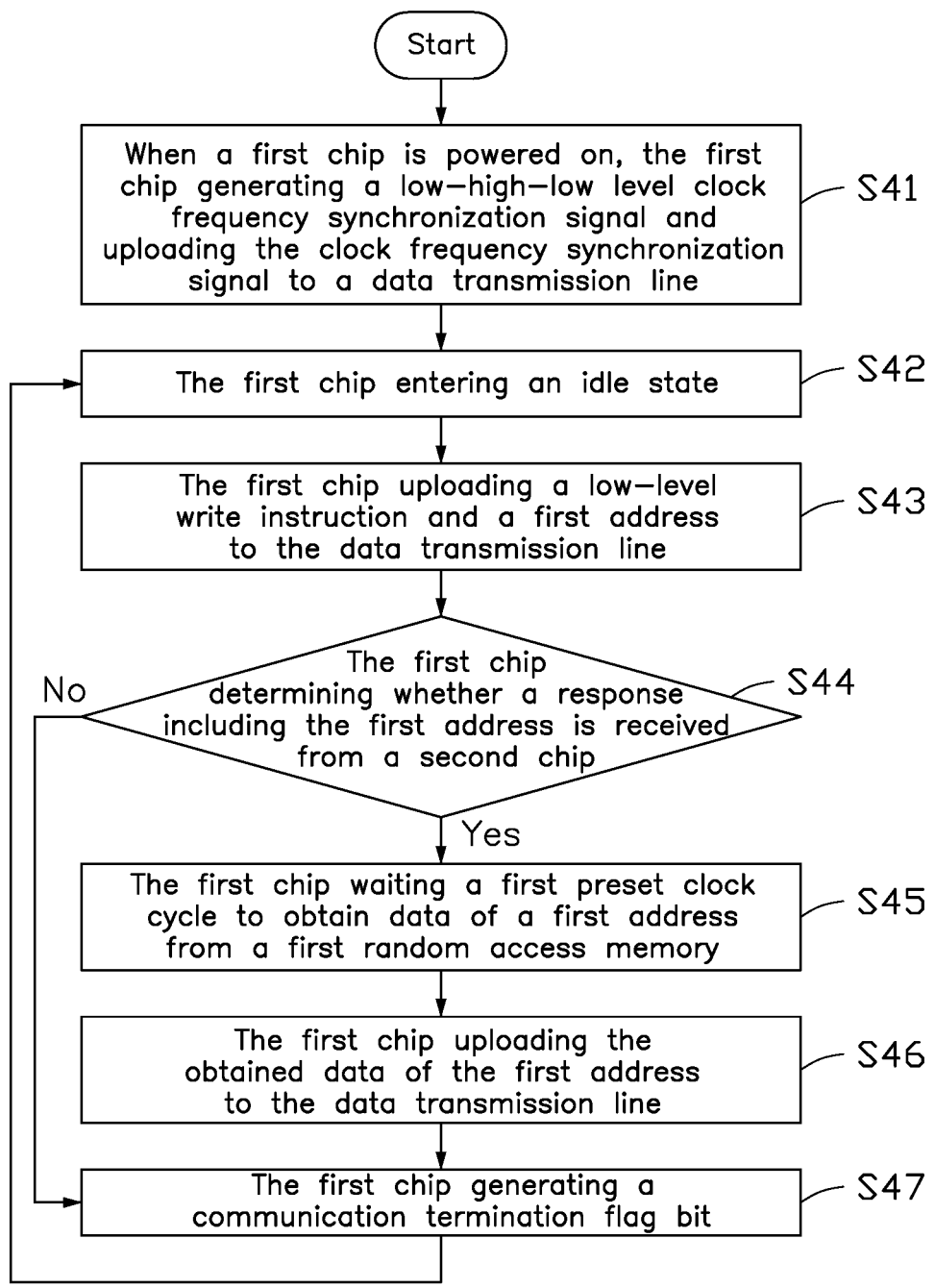
FIG. 4 is a flowchart of a single-wire two-way communication method implemented by a first chip when the first chip performs a write operation.

FIG. 4 is a flowchart of a single-wire two-way communication method implemented by a first chip when the first chip performs a write operation. The single-wire two-way communication method is applied to the first chip and a second chip. The first chip is coupled to the second chip through a single data transmission line. The first chip includes a first random access memory. The steps performed by the first chip when the first chip performs a wire operation in the single-wire two-way communication method includes the following:

At block S41, when the first chip is powered on, the first chip generates a low-high-low level clock frequency synchronization signal and uploads the clock frequency synchronization signal to the data transmission line.

At block S42, the first chip enters an idle state.

At block S43, the first chip uploads a low-level write instruction and a first address to the data transmission line.

At block S44, the first chip determines whether a response including the first address is received from the second chip. In response that the first chip receives the response including the first address from the second chip, block S45 is implemented. In response that the first chip does not receive the response including the first address from the second chip, block S47 is implemented.

At block S45, the first chip waits a first preset clock cycle to obtain the data of the first address from the first random access memory.

At block S46, the first chip uploads the obtained data of the first address to the data transmission line.

At block S47, the first chip generates a communication termination flag bit. Then, step S42 is implemented.

Figure 5:
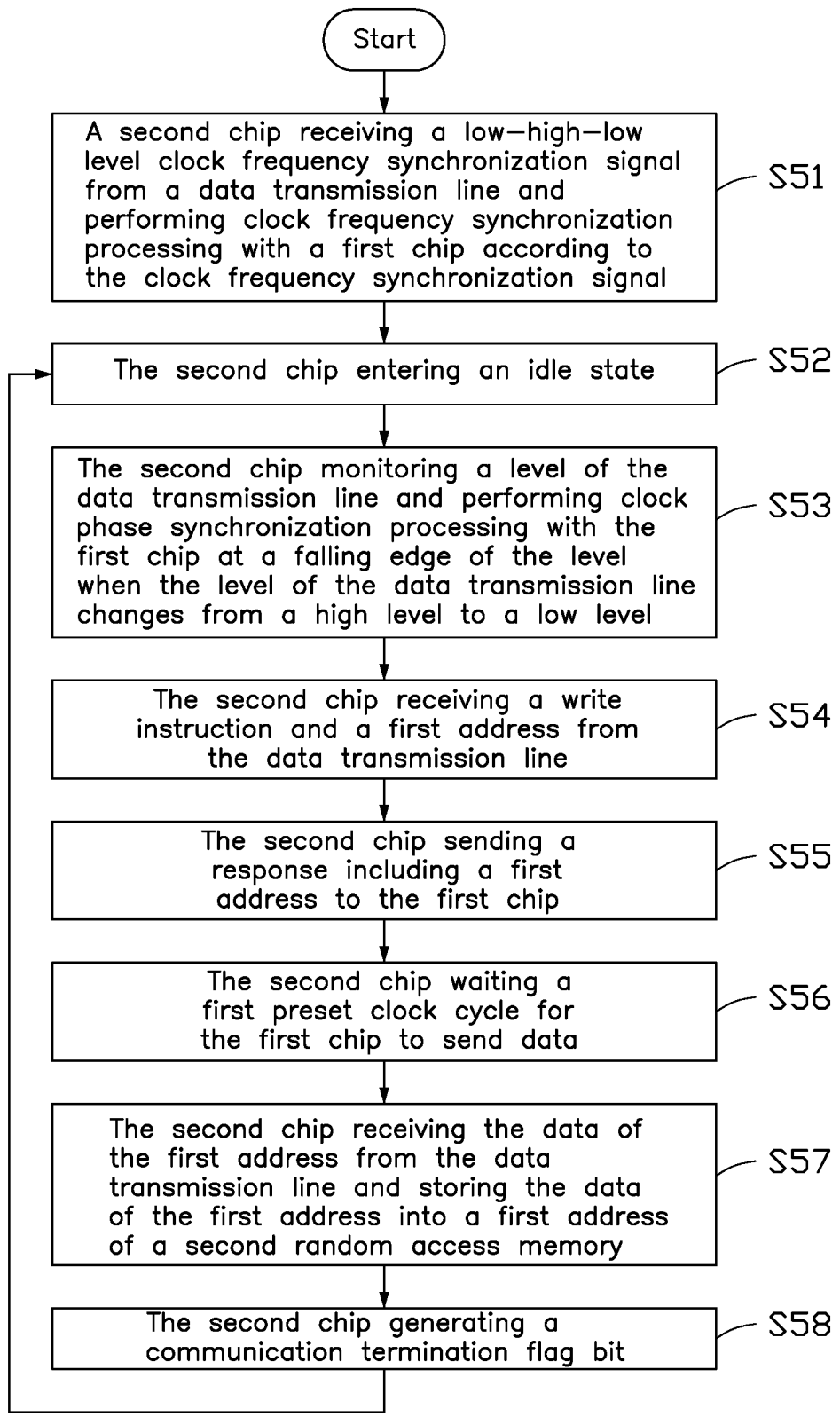
FIG. 5 is a flowchart of a single-wire two-way communication method implemented by a second chip when the first chip performs a write operation.

FIG. 5 is a flowchart of a single-wire two-way communication method implemented by a second chip when a first chip performs a write operation. The single-wire two-way communication method is applied to the first chip and the second chip. The second chip is coupled to the first chip through a single data transmission line. The second chip includes a second random access memory. The steps performed by the second chip when the first chip performs a wire operation in the single-wire two-way communication method includes the following:

At block S51, the second chip receives a low-high-low level clock frequency synchronization signal from the data transmission line and performs clock frequency synchronization processing with the first chip according to the clock frequency synchronization signal.

At block S52, the second chip enters an idle state.

At block S53, the second chip monitors a level of the data transmission line and performs clock phase synchronization processing with the first chip at a falling edge of the level when the level of the data transmission line changes from a high level to a low level.

At block S54, the second chip receives a write instruction and a first address from the data transmission line.

At block S55, the second chip sends a response including the first address to the first chip.

At block S56, the second chip waits a first preset clock cycle for the first chip to send data.

At block S57, the second chip receives the data of the first address from the data transmission line and stores the data of the first address into a first address of the second random access memory.

At block S58, the second chip generates a communication termination flag bit. Then, block S52 is implemented.

Figure 6:
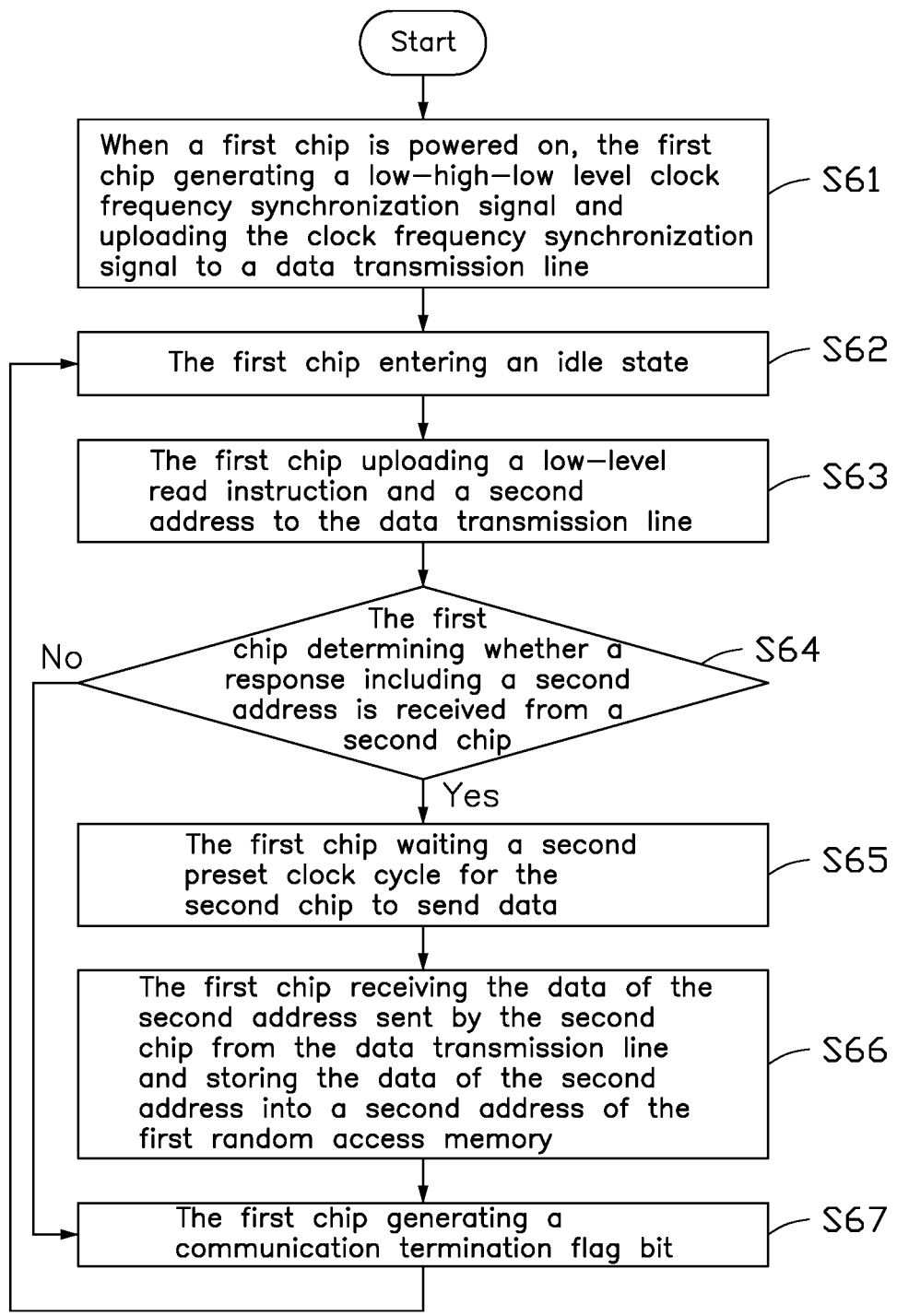
FIG. 6 is a flowchart of a single-wire two-way communication method implemented by the first chip when the first chip performs a read operation.

FIG. 6 is a flowchart of a single-wire two-way communication method implemented by a first chip when the first chip performs a read operation. The single-wire two-way communication method is applied to the first chip and a second chip. The first chip is coupled to the second chip through a single data transmission line. The first chip includes a first random access memory. The steps performed by the first chip when the first chip performs a read operation in the single-wire two-way communication method includes the following:

At block S61, when the first chip is powered on, the first chip generates a low-high-low level clock frequency synchronization signal and uploads the clock frequency synchronization signal to the data transmission line.

At block S62, the first chip enters an idle state.

At block S63, the first chip uploads a low-level read instruction and a second address to the data transmission line.

At block S64, the first chip determines whether a response including a second address is received from the second chip. In response that the first chip receives the response including the second address from the second chip, block S65 is implemented. In response that the first chip does not receive the response including the second address from the second chip, block S67 is implemented.

At block S65, the first chip waits a second preset clock cycle for the second chip to send data.

At block S66, the first chip receives the data of the second address sent by the second chip from the data transmission line and stores the data of the second address into a second address of the first random access memory.

At block S67, the first chip generates a communication termination flag bit. Then, block S62 is implemented.

Figure 7:
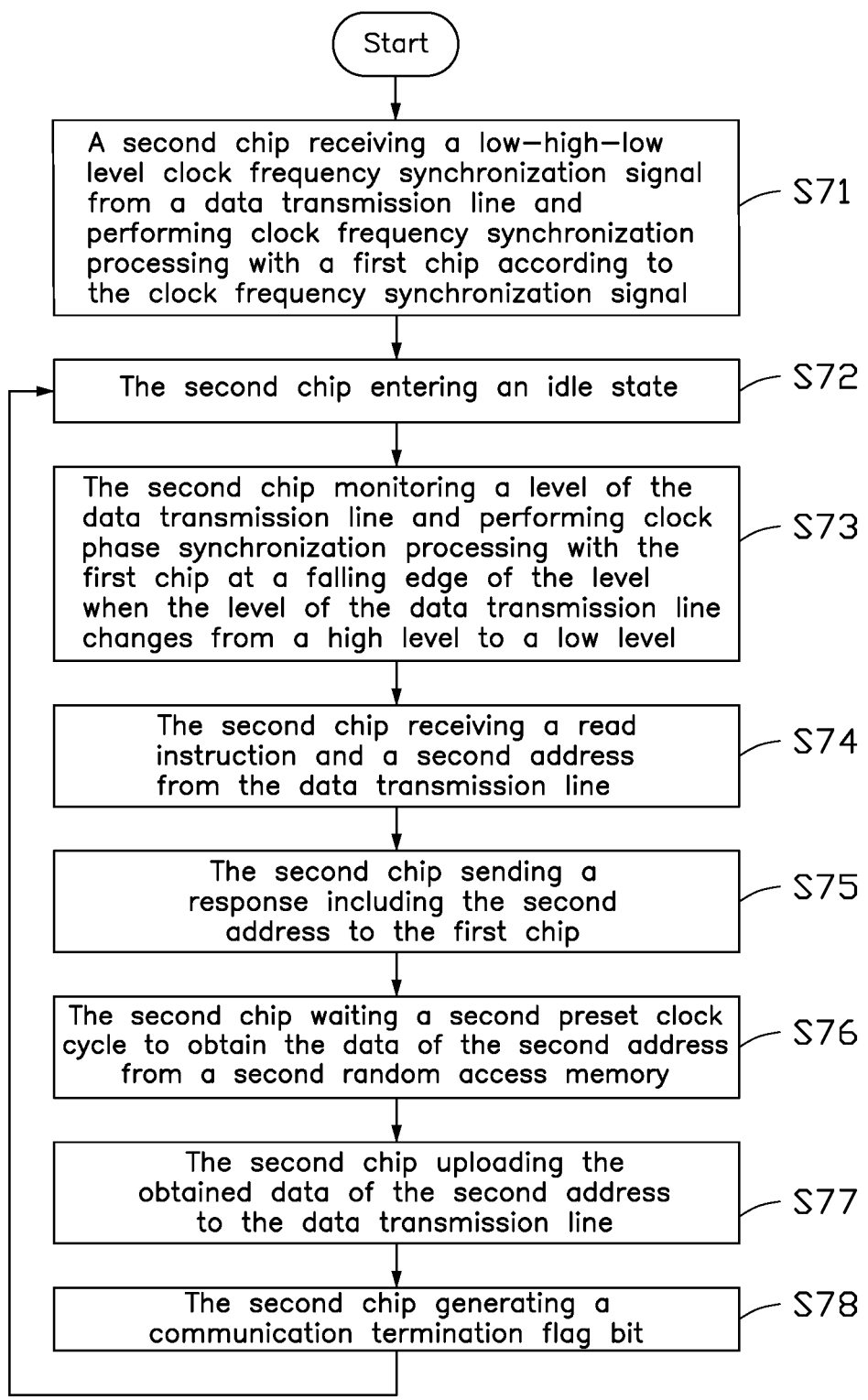
FIG. 7 is a flowchart of a single-wire two-way communication method implemented by the second chip when the first chip performs a read operation.

FIG. 7 is a flowchart of a single-wire two-way communication method implemented by a second chip when a first chip performs a read operation. The single-wire two-way communication method is applied to the first chip and the second chip. The second chip is coupled to the first chip through a single data transmission line. The second chip includes a second random access memory. The steps performed by the second chip when the first chip performs a read operation in the single-wire two-way communication method includes the following:

At block S71, the second chip receives a low-high-low level clock frequency synchronization signal from the data transmission line and performs clock frequency synchronization processing with the first chip according to the clock frequency synchronization signal.

At block S72, the second chip enters an idle state.

At block S73, the second chip monitors a level of the data transmission line and performs clock phase synchronization processing with the first chip at a falling edge of the level when the level of the data transmission line changes from a high level to a low level.

At block S74, the second chip receives a read instruction and a second address from the data transmission line.

At block S75, the second chip sends a response including the second address to the first chip.

At block S76, the second chip waits a second preset clock cycle to obtain the data of the second address from the second random access memory.

At block S77, the second chip uploads the obtained data of the second address to the data transmission line.

At block S78, the second chip generates a communication termination flag bit. Then, block S72 is implemented.

Obviously, the single-wire two-way communication method can be varied to other embodiments, the detail can be referred to the single-wire two-way communication circuit, and is not described herein.

In summary, the data control module obtains the data of the first address from the random access memory. The data line control module sends the obtained data of the first address to the other chip through the data transmission line to perform a write operation. The data line monitoring module receives the data of the second address sent by the other chip through the data transmission line to perform a read operation, and then stores the data of the second address received from the other chip into the second address of the random access memory. Thus, input/output pins can be saved, and data reading and writing of specific addresses can be initiated.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A single-wire two-way communication circuit comprising:
    two chips; and
    a data transmission line coupled between the two chips; wherein:
    each of the two chips comprises a random access memory, a data control module, a data line control module, and a data line monitoring module;
    the random access memory is configured to store data;
    the data control module is coupled to the random access memory, the data control module is configured to obtain data of a first address from the random access memory, and store data of a second address received from the other one of the two chips into a second address of the random access memory;
    the data line control module is coupled to the data control module and the data transmission line, the data line control module configured to send the obtained data of the first address to the other chip through the data transmission line to perform a write operation;
    the data line monitoring module is coupled to the data control module and the data transmission line, the data line monitoring module configured to receive the data of the second address sent by the other chip through the data transmission line to perform a read operation;

the data line control module is further configured to send a low-level write instruction and the first address to the other chip through the data transmission line to perform the write operation to the other chip, and send a low-level read instruction through the data transmission line and the second address to the other chip to perform the read operation to the other chip; and
    the data line monitoring module is further configured to receive the write instruction and the first address sent by the other chip through the data transmission line, and receive the read instruction and the second address sent by the other chip through the data transmission line.

2. The single-wire two-way communication circuit of claim 1, wherein:
    each of the two chips further comprises a clock generation module configured to generate a clock frequency synchronization signal when the chip is powered on;
    the data line control module is further configured to send the clock frequency synchronization signal to the other chip through the data transmission line, and then enter an idle state;
    the data line monitoring module is further configured to receive the clock frequency synchronization signal sent by the other chip through the data transmission line, perform clock frequency synchronization processing with the other chip according to the clock frequency synchronization signal, and then enter an idle state.

3. The single-wire two-way communication circuit of claim 2, wherein:
    the data line monitoring module is further configured to monitor a level of the data transmission line in the idle state and perform clock phase synchronization processing with the other chip at a falling edge of the level when the level of the data transmission line changes from a high level to a low level.

4. The single-wire two-way communication circuit of claim 2, wherein:
    the data line control module is further configured to generate a communication termination flag bit after sending the data of the first address through the data transmission line, and then enter the idle state; and
    the data line monitoring module is further configured to generate a communication termination flag bit after the data control module stores the data of the second address received from the other chip into the second address of the random access memory, and then enter the idle state.

5. A single-wire two-way communication method applied to a first chip and a second chip when the first chip performs a write operation, the first chip being coupled to the second chip through a data transmission line, the first chip comprising a first random access memory, and the second chip comprising a second random access memory, the single-wire two-way communication method comprising:
    the first chip uploading a low-level write instruction and the first address to the data transmission line;
    the second chip receiving the write instruction and the first address from the data transmission line;
    the first chip obtaining data of a first address from the first random access memory, and uploading the obtained data of the first address to the data transmission line; and
    the second chip receiving the data of the first address from the data transmission line, and storing the data of the first address into the first address of the second random access memory.

6. The single-wire two-way communication method of claim 5, wherein before the first chip performs the write operation, the single-wire two-way communication method further comprises:
when the first chip is powered on, generating a clock frequency synchronization signal, uploading the clock frequency synchronization signal to the data transmission line, and entering the idle state; and
the second chip receiving the clock frequency synchronization signal from the data transmission line, performing clock frequency synchronization processing with the first chip according to the clock frequency synchronization signal, and entering the idle state.

7. The single-line two-way communication method of claim 6, wherein the single-line two-way communication method further comprises:
the second chip monitoring a level of the data transmission line in the idle state and performing clock phase synchronization processing with the first chip at a falling edge of the level when the level of the data transmission line changes from a high level to a low level.

8. The single-wire two-way communication method of claim 6, wherein after uploading the obtained data of the first address to the data transmission line, the single-wire two-way communication method further comprises:
the first chip generating a communication termination flag bit and entering the idle state.

9. The single-wire two-way communication method of claim 8, wherein after storing the data of the first address into the first address of the second random access memory, the single-wire two-way communication method further comprises:
the second chip generating a communication termination flag bit and entering the idle state.

10. A single-wire two-way communication method applied to a first chip and a second chip when the first chip performs a read operation, the first chip being coupled to the second chip through a data transmission line, the first chip comprising a first random access memory, and the second chip comprising a second random access memory, the single-wire two-way communication method comprising:
the first chip uploading a low-level read instruction and the second address to the data transmission line;
the second chip receiving the read instruction and the second address from the data transmission line;
the second chip obtaining data of a second address from the second random access memory, and uploading the obtained data of the second address to the data transmission line; and
the first chip receiving the data of the second address from the data transmission line, and storing the data of the second address into a second address of the first random access memory.

11. The single-wire two-way communication method of claim 10, wherein before the first chip performs the read operation, the single-wire two-way communication method further comprises:
when the first chip is powered on, generating a clock frequency synchronization signal, uploading the clock frequency synchronization signal to the data transmission line, and entering the idle state; and
the second chip receiving the clock frequency synchronization signal from the data transmission line, performing clock frequency synchronization processing with the first chip according to the clock frequency synchronization signal, and entering the idle state.

12. The single-line two-way communication method of claim 11, wherein the single-line two-way communication method further comprises:
the second chip monitoring a level of the data transmission line in the idle state and performing clock phase synchronization processing with the first chip at a falling edge of the level when the level of the data transmission line changes from a high level to a low level.

13. The single-wire two-way communication method of claim 11, wherein after uploading the obtained data of the second address to the data transmission line, the single-wire two-way communication method further comprises:
the second chip generating the communication termination flag bit and entering the idle state.

14. The single-wire two-way communication method of claim 13, wherein after storing the data of the second address into the second address of the first random access memory, the single-wire two-way communication method further comprises:
the first chip generating the communication termination flag bit and entering the idle state.

* * * * *